(12) United States Patent
Annous et al.

(10) Patent No.: US 10,537,125 B2
(45) Date of Patent: Jan. 21, 2020

(54) CHLORINE DIOXIDE GAS RELEASING PACKAGE LABEL INSERT FOR ENHANCING MICROBIAL SAFETY OF FOOD

(71) Applicants: The United States of America, as Represented by the Secretary of Agriculture, Washington, DC (US); Rutgers University, New Brunswick, NJ (US)

(72) Inventors: Bassam A Annous, North Wales, PA (US); Carol Saade, Battle Creek, MI (US); Kit L. Yam, New Brunswick, NJ (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 169 days.

(21) Appl. No.: 15/602,263

(22) Filed: May 23, 2017

(65) Prior Publication Data
US 2017/0332674 A1    Nov. 23, 2017

Related U.S. Application Data

(60) Provisional application No. 62/340,191, filed on May 23, 2016.

(51) Int. Cl.
*A61L 9/00* (2006.01)
*A01N 25/34* (2006.01)
(Continued)

(52) U.S. Cl.
CPC ............ *A23L 3/349* (2013.01); *B65D 81/28* (2013.01); *A23V 2002/00* (2013.01)

(58) Field of Classification Search
CPC .......... A61L 2/0094; A61L 2/20; A61L 2/232; A23L 3/349; B65D 81/28; A61K 33/00
(Continued)

(56) References Cited

U.S. PATENT DOCUMENTS

| 6,046,243 A * | 4/2000 | Wellinghoff | ........... A01N 59/00 514/772.3 |
| 2010/0297316 A1 * | 11/2010 | Gutzmann | ............... A23B 4/20 426/332 |

(Continued)

OTHER PUBLICATIONS

Ray, Soumi et al.; "Development of Chlorine Dioxide Releasing Film and Its Application in Decontaminating Fresh Produce", Journal of Food Science, (2013), 78(2):276-284.

*Primary Examiner* — Monzer R Chorbaji
(74) *Attorney, Agent, or Firm* — John D. Fado; G. Byron Stover (57) ABSTRACT

Disclosed herein are chlorine dioxide releasing package label/inserts to be used inside a package or in an outer plastic bag containing several individual packages, the package label/insert containing (a) at least one layer of pectin and citric acid, (b) at least one layer of gelatin and sodium chlorite, (c) optionally at least one barrier layer containing gelatin (without sodium chlorite) between the at least one layer of pectin and citric acid and the at least one layer of gelatin and sodium chlorite, and (d) an adhesive joining said layers, wherein the package label/insert has alternating layers of the at least one layer of pectin and citric acid and the at least one layer of gelatin and sodium chlorite. Also disclosed are methods of killing microorganisms on an item using the package label/insert described herein.

7 Claims, 8 Drawing Sheets

Molecular structure of layers (51) Int. Cl.
*B65D 81/28* (2006.01)
*A61B 17/06* (2006.01)
*A62D 3/00* (2006.01)
*A23L 3/349* (2006.01)

(58) Field of Classification Search
USPC ..... 422/1, 28, 37, 305–306; 206/213.1, 439, 206/524.7; 424/484, 405, 412; 252/187.23, 187.21
See application file for complete search history.

(56) References Cited

U.S. PATENT DOCUMENTS

| | | |
|---|---|---|
| 2011/0155618 A1 | 6/2011 | Rubino et al. |
| 2013/0164471 A1* | 6/2013 | Suzuki ..................... B32B 7/06 428/35.7 |
| 2014/0231283 A1 | 8/2014 | Rubino et al. |

* cited by examiner

CHLORINE DIOXIDE GAS RELEASING PACKAGE LABEL INSERT FOR ENHANCING MICROBIAL SAFETY OF FOOD

REFERENCE TO RELATED APPLICATION

This application claims the benefit of U.S. Provisional Application No. 62/340,191, filed 23 May 2016, which is incorporated herein by reference in its entirety.

BACKGROUND OF THE INVENTION

Disclosed herein are biobased chlorine dioxide releasing package label/inserts to be used inside a package, the package label/insert containing (a) at least one layer of pectin and citric acid, (b) at least one layer of gelatin and sodium chlorite, (c) optionally at least one barrier layer containing gelatin (without sodium chlorite) between the at least one layer of pectin and citric acid and the at least one layer of gelatin and sodium chlorite, and (d) an adhesive joining said layers, wherein the package label/insert has alternating layers of the at least one layer of pectin and citric acid and the at least one layer of gelatin and sodium chlorite. Also disclosed are methods of killing microorganisms on an item, involving placing the item in a container or in an outer plastic bag containing several individual packages with the package label/insert described herein and activating the package label/insert to cause the citric acid to come into contact with the sodium chlorite to produce $ClO_2$, wherein the package label releases $ClO_2$ at concentrations of about 1.7 to about 19.1 mg/L air (e.g., 1.7 to 19.1 mg/L air).

Fresh produce consumption is associated with foodborne illnesses. Washing fruits and vegetables with aqueous sanitizing solutions, such as chlorine, is currently used by the industry to reduce microorganisms on the surface of these products and improve their safety. However, these sanitizers in solution cannot penetrate inaccessible areas such as pores, channels and crevices where microorganisms are attached (Annous and Burke, J. Food Prot., 78(5):868-872 (2015)) due to the hydrophobicity of these regions and surface tension (Gomez-Lopez, V., et al., Critical Reviews in Food Science and Nutrition, 48(6): 487-495 (2008); Harris, L. J., et al., Comprehensive Reviews in Food Science and Food Safety, p. 78-141 (2003)).

Gaseous chlorine dioxide has the ability to penetrate and inactivate human pathogens attached to hard-to-reach sites on produce surfaces (Annous and Burke, 2015; Han, Y., et al., Food Microbiology, 17(5): 521-533 (2000)). Chlorine dioxide gas is an effective biocide over a wide range of pH from 3 to 8 (Keskinen and Annous, Chlorine Dioxide (Gas) in Nonthermal Processing Technologies for Food, H. Q. Zhang, et al., Editors, 2011, Wiley, p. 359-365). This gas can be generated by the reaction of an acid with sodium chlorite salt in the presence of moisture (Keskinen and Annous 2011; Kuen S. L., et al., Nature and Science, 5(4): 94-99 (2007); Masschelein, W. J., Chlorine Dioxide-Chemistry and Environmental Impact of Oxychlorine Compounds, 1979, Ann Arbor Science Publishers, Inc., Ann Arbor, Mich.). Unlike chlorine, $ClO_2$ does not chlorinate organic compounds to produce carcinogenic trihalomethanes (THMs); nor does it react with ammonia to form chloramines (Keskinen and Annous, 2011); thus making it very attractive for use as an antimicrobial for foods. In 2001, $ClO_2$ received FDA approval for use to reduce or eliminate microorganisms in a wide variety of food products such as fruits and vegetables (Rulis, A. M., Agency response letter GRAS notice no. GRN 0 00062, 2001). Thus the use of $ClO_2$ can provide an additional hurdle to inactivate and/or inhibit the growth of microorganisms, including human pathogens.

However, due to the safety hazards associated with its storage and distribution, $ClO_2$ is usually generated on site upon demand (Keskinen and Annous, 2011). Current on-site $ClO_2$ generation systems include: (1) stand-alone generators (Annous and Burke, 2015; Prodduk et al., 2014), (2) sachets containing the mixed precursors (e.g., acid with sodium chlorite (Rubino et al., 2011, 2014)), or (3) package films impregnated with the precursors (Ray et al., 2013).

Stand-alone generators, which are on/off systems, offer precise control over when and how much gas to generate but are expensive to operate due to high initial investment and continuous service requirements. They are appropriate for large-scale treatments such as gassing large rooms containing large amount of products. Since the risk of post-treatment re-contamination during packaging does exist, the use of an in-package $ClO_2$ source as the primary and/or secondary treatment would serve as an additional hurdle for microorganism to survive within the package.

In contrast to on/off stand-alone generators, mixing $ClO_2$ precursors within a sachet initiates the reaction and continues $ClO_2$ production until all of the reactants are consumed. Sachets with $ClO_2$ precursors can be packaged with target products to provide treatments in situ. However, the $ClO_2$ precursors (acid and sodium chlorite) are usually separated by a thin membrane, increasing the risk of premature reaction prior to use. In addition, chemical contamination of food from possible rupture of the sachet along with consumers' negative perceptions towards sachets of chemicals within packages make this system less effective and less appealing.

Impregnating package films with both precursors eliminates the potential hazard of contaminating the packaged product with $ClO_2$ precursors. However, in this case, $ClO_2$ generation begins when the film is manufactured and both chemicals embedded within the film start reacting. This shortens the film shelf life and the antimicrobial activity decreases with storage of the film, resulting in inconsistent levels of $ClO_2$ produced when the film is used.

An active packaging system capable of generating and releasing $ClO_2$ when needed could overcome these limitations. One way to address these safety and limitation concerns would be to generate this compound using the labels described below, which may be conveniently placed inside packages.

Earlier we demonstrated the technical feasibility of producing synthetic labels containing ethylene vinyl acetate (EVA; 28% vinyl acetate (VA) and citric acid using extrusion techniques (Saade et al., System Feasibility: designing a chlorine dioxide self-releasing package label to improve fresh produce safety part I: Extrusion approach, Innov. Food Sci. Emerg. Technolo., submitted (2017)). These labels could generate and release gaseous $ClO_2$ in response to a controlled activation mechanism that involved spraying the surface of these labels with concentrated sodium chlorite solution followed by applying heat and pressure. Chlorine dioxide was generated from the reaction of citric acid located at the surface of these labels. The $ClO_2$ generated by these EVA labels was between 6 and 42% of the theoretical calculated yields. This suggested that citric acid molecules located in the bulk of the polymer were inaccessible for reaction due to the hydrophobic nature of EVA polymer. EVA labels released gaseous $ClO_2$ ranging between 0.5 and 3.8 mg/L air, achieving up to 2.3 log reductions (complete inactivation) of *Salmonella* Montevideo G4639 cells on Tryptic Soy Agar plates (Saade et al., 2017).

To overcome this limitation, we have developed the biobased labels described herein to surprisingly achieve more effective and better control of the release of $ClO_2$, which is necessary for matching the microbial kinetic requirement on food surfaces, medical equipment, and other potential applications requiring decontamination within a package/container systems.

SUMMARY OF THE INVENTION

Disclosed herein are biobased chlorine dioxide releasing package label/inserts to be used inside a package, the package label/insert containing (a) at least one layer of pectin and citric acid, (b) at least one layer of gelatin and sodium chlorite, (c) optionally at least one barrier layer containing gelatin (without sodium chlorite) between the at least one layer of pectin and citric acid and the at least one layer of gelatin and sodium chlorite, and (d) an adhesive joining said layers, wherein the package label/insert has alternating layers of the at least one layer of pectin and citric acid and the at least one layer of gelatin and sodium chlorite. Also disclosed are methods of killing microorganisms on an item, involving placing the item in a container or in an outer plastic bag containing several individual packages with the package label/insert described herein and activating the package label/insert to cause the citric acid to come into contact with the sodium chlorite to produce $ClO_2$, wherein the package label releases $ClO_2$ at concentrations of about 1.7 to about 19.1 mg/L air.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1A and FIG. 1B show biobased label/insert design: FIG. 1A is multilayer package label without barrier layers and FIG. 1B is multilayer package label with barrier layers as described below: (FIG. 1A) Multilayer package label without barrier layers (Multilayer Label (ML) w/o Barrier Layer (BL)) was composed of continuous layers of pectin embedded with citric acid (3 layers) and gelatin embedded with sodium chlorite (2 layers). The package label obtained had a surface area of 10 $cm^2$ and 1.4 mm (55 mil) thickness; (FIG. 1B) Multilayer package label with barrier layers (ML w/BL) was composed of continuous layers of pectin embedded with citric acid (3 layers) and gelatin embedded with sodium chlorite (2 layers) which were separated by gelatin (without sodium chlorite) barrier layers (4 layers). The package label obtained had a surface area of 10 $cm^2$ and 3 mm (118 mil) thickness; preferably the label thickness should be about 30 mil or less with larger surface area.

FIG. 2 shows inter-layer binding of pectin (embedded with citric acid) and gelatin (embedded with sodium chlorite) layers as described below. Application of the positively charged gelatin glue solution on the surface of slightly negatively charged pectin layer followed by pressing the layers at about 100 KPa for 5 s, will allow the negatively charged gelatin layer to promote binding and achieve uniform contact between these layers. This contact between functional pectin and gelatin layers will trigger the chemical reaction between the embedded precursors for the release of chlorine dioxide gas.

FIG. 3 shows molecular structures as well as the generation, diffusion, and release of $ClO_2$ from the multilayer label of pectin and gelatin functional layers as described below. Upon activation of the label: (1) moisture starts diffusing from the gelatin functional layer toward upper and lower pectin functional layers causing polymer relaxation of these matrices; (2) higher mobility and diffusion of protons and chlorite ions down their gradient of concentration; (3) moisture released from respiration of fresh produce acts further on the label by causing swelling of the corresponding layers starting with outermost pectin functional layer and the release of the bulk of $ClO_2$ over time. Moisture content of gelatin functional layer acts as a short-term trigger for $ClO_2$ release whereas moisture released from fresh produce respiration constitutes the long-term trigger.

FIG. 4 shows the molecular structure as well as the generation, diffusion, and release of $ClO_2$ from the multilayer label of pectin and gelatin functional layers with gelatin barrier layers as described below. Upon activation of the package label: (1) moisture starts diffusing from the gelatin barrier layer toward upper pectin functional layer and lower gelatin functional layer causing slight polymer relaxation of these matrices; (2) higher mobility and diffusion of protons and chlorite ions down their gradient of concentration; (3) moisture released from respiration of fresh produce acts further on the label by causing swelling of the corresponding layers starting with outermost pectin functional layer and the release of the bulk of $ClO_2$ over time. Moisture content of gelatin barrier layer acts as a short-term trigger to $ClO_2$ release whereas that released from fresh produce respiration constitutes the long-term trigger.

FIG. 5 shows release profiles of $ClO_2$ gas (mg) from multilayer label (5 layers) without gelatin barrier layers and multilayer label (9 layers) with gelatin barrier layers over time after controlled activation at 10 and 23° C. as described below. Two release profiles of $ClO_2$ gas were achieved: (1) fast release with high concentration profile with multilayer label/insert without barrier layers; (2) slow release with low concentration profile with the multilayer label insert with barrier layers incorporated between the pectin and gelatin functional layers. Activation of chemical reaction and $ClO_2$ release from labels was triggered by inherent moisture of the gelatin barrier and functional layers and maintained by the moisture released from respiration of fresh produce. This allowed diffusion of $ClO_2$ precursors, their chemical reaction, and $ClO_2$ release out of label. The results of the release kinetics analysis supported the main objective of this work, the technical feasibility of the package label in terms of generation and controlled release of $ClO_2$ over time after label activation (pressure and moisture).

FIG. 6 shows the release profile of $ClO_2$ gas (mg) from multilayer label (3 or 5 layers) without gelatin barrier layers and multilayer label (5 or 9 layers) with gelatin barrier layers over time after controlled activation at 23° C. as described below. The increase of multilayer label from 3 to 5 layers without the gelatin barrier layers surprisingly resulted in 150% (2.5 fold) increase in total $ClO_2$ production. The addition of barrier layers to these labels resulted in up to 75% reduction in $ClO_2$ production as previously seen (FIG. 5). The data presented here indicated that the total $ClO_2$ production could be modulated by increasing the number of functional layers of pectin and gelatin and/or through the inclusion of the gelatin barrier layers. Thus, the results of the release kinetics analysis supported the main objective of this work, the technical feasibility of the package label in terms of generation and controlled release of $ClO_2$ over time after label activation.

DETAILED DESCRIPTION OF THE INVENTION

Disclosed herein are biobased package labels/inserts which release chlorine dioxide gas ($ClO_2$), containing at least one layer of pectin embedded with citric acid and at least one layer of gelatin embedded with sodium chlorite, wherein each layer of pectin with citric acid is adjacent to each layer of gelatin with sodium chlorite. Optionally, a gelatin barrier layer (without sodium chlorite) is inserted between each layer of pectin with citric acid and each layer of gelatin with sodium chlorite. Gelatin barrier layers are used to modulate the release rate and/or concentration of $ClO_2$ produced by the package label. Chlorine dioxide gas produced by the package labels kills or inhibits the growth of microorganisms, including human pathogens, on food surfaces inside the package. Also disclosed are methods of killing microorganisms on an item, involving placing the item in a container or in an outer plastic bag containing several individual packages with the package label/insert described herein and activating the package label/insert to cause the citric acid to come into contact with the sodium chlorite to produce $ClO_2$, wherein the package label releases $ClO_2$ at concentrations of about 1.7 to about 19.1 mg/L air.

There exists the need to achieve a better control over the release of $ClO_2$ from a package label/insert to enhance microbial safety of items such as food products (e.g., fresh produce) which led us to investigate biopolymers (e.g., pectin and gelatin) and manufacturing techniques (e.g., solution coating). We evaluated the feasibility of a biobased $ClO_2$ self-generating package label made of pectin and gelatin. The package insert was designed to generate and release gaseous $ClO_2$, when needed, in a controlled manner within a package system in response to controlled activation mechanism.

The term "item" includes anything in a container which needs inactivation and/or inhibition of microorganisms and is not negatively affected by $ClO_2$. This would include food and food products and well as medical equipment and other potential decontamination operations. Foods treated by the methods described herein include fruits, vegetables, and meat products. Particularly included are apples, melons, apricots, peaches, pears, avocados, bananas, artichokes, beans, bell peppers, carrots, celery, corn, garlic, horseradish, leeks, lima beans, mushrooms, onions, parsnips, peas, pimiento, tomato, turnips, lettuce, tomatoes, corn, garlic, horseradish, leeks, lima beans, mushrooms, onions, parsnips, peas, pimiento, tomato, turnips, lettuce, and tomatoes. Foods also include tubers (e.g., solanum tuberosum including varieties Russet potatoes, Kennebec potatoes, Hilite potatoes, Norkata potatoes, and Norgold potatoes). Foods particularly include fresh-cut produce (e.g., fruits and vegetables) which is produce that has been, for example, peeled, cut, sliced, or shredded. The fruits and vegetables may be subjected to various processing techniques wherein they are subjected to disorganization of their natural structure, as by peeling, cutting, comminuting, pitting, pulping, freezing and dehydrating.

Food products that may be treated using the present invention also include meat products (e.g., beef, pork, poultry, fish, seafood, shellfish or crustaceans such as shrimp). Meat products include, for example, ready-to-eat (RTE) meats and poultry products which include a vast array of products such as bacon, ham (whole or partial), fresh or fermented sausages of all types (such as beef, pork, chicken, turkey, fish, etc.), deli and luncheon meats, hotdogs (frankfurters), bologna and kielbasa type products, delicatessen specialties and pts, dried meat and poultry products, such as beef jerky and turkey jerky; and frozen meat and poultry such as pre-cooked frozen beef patties and pre-cooked frozen fried chicken. The term "ready-to-eat meat product" means a meat product that has been processed so that the meat product may be safely consumed without further preparation by the consumer, that is, without cooking or application of some other lethality treatment to destroy pathogens. Thus, unlike other meat products, ready-to-eat meat products are generally consumed without further cooking; therefore, they require that pathogens be rigorously controlled during processing and storage. Meat products also include uncooked meat products.

Package label concept development: The biobased package label was a multilayered $ClO_2$ self-releasing system made of continuous layers of pectin embedded with citric acid and gelatin embedded with sodium chlorite, using solution casting technique (see below). The constituent layers of this label were first assembled, then instantly activated by application of pressure (about 100 KPa (e.g., 100 KPa), with or without heat) at the point of use for about 5 s.. The release of $ClO_2$ from these labels can be sustained by the moisture released by fresh produce during respiration within the package.

Figure 1:
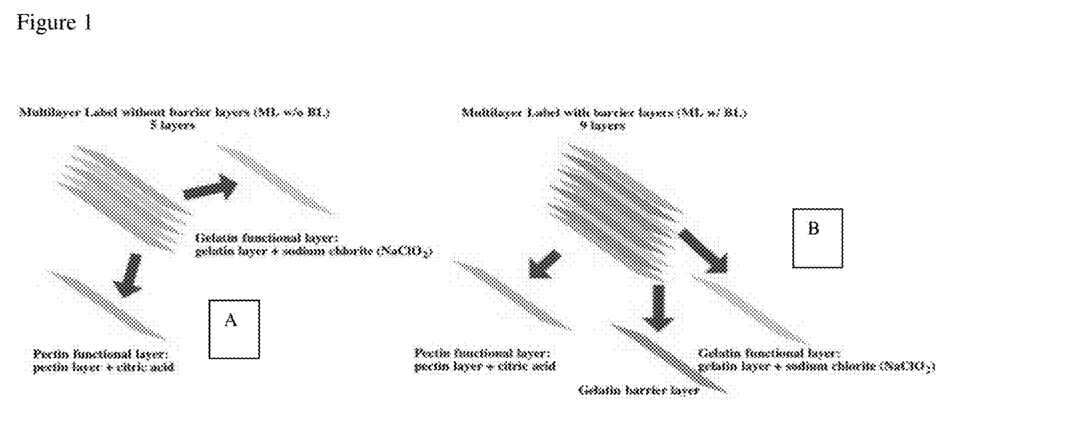

Multilayer labels (ML) were developed with (w/) or without (w/o) a gelatin barrier layer (BL; made without sodium chlorite). The BL was inserted between functional layers of pectin with citric acid and gelatin with sodium chlorite (FIG. 1B). The functionality of the barrier layer is to control the release rate and/or concentration of $ClO_2$ released, following the activation of the label, to achieve release profiles suitable for different food products including fresh produce.

Feasibility: The feasibility of biobased package labels was achieved upon meeting all of the following criteria: 1) successful manufacture of the label by solution casting based on the envisioned concept, 2) ability of the manufactured labels to generate and release $ClO_2$ after controlled activation mechanism, and 3) matching between $ClO_2$ release kinetics and microbial kinetics of target microorganism in order to improve safety of food products (e.g., fresh produce). In other words, the biobased package labels should release $ClO_2$ at concentrations within the practical concentration range (about 0.5 to about 18 mg/L air; e.g., 0.5 to 18 mg/L air) reported in literature for the inactivation of microorganisms on the surface of fresh produce without compromising their quality attributes (Gómez-López, V. M., et al., Trends in Food Science & Technology, 20(1): 17-26 (2009)).

Pectin functional layer: Any pectin may be utilized for the purpose of making these layers. Commercially available low-methoxyl (LM) pectin is usually mixed with sugar for the purpose of standardization, and a sugar removal step was required to obtain pure LM pectin. Sugar was removed by dissolving the standardized LM pectin (32% Degree of Esterification and 28% sucrose) in methanol/water solution (about 70:30, v/v), stirring overnight to dissolve the sugar and precipitate the LM pectin. The mix was then filtered to separate dissolved sugars in solvents from LM pectin, and the filtrate freeze-dried and ground to a fine powder using a mortar and a pestle. Pectin films may be manufactured by any known method, such as solution casting technique by adding a slow stream of LM pectin (final concentration of about 5%, w/w water) into water containing about 3% (w/w) glycerol, then heating to about 70° C. to ensure complete dissolution of pectin in solution. Crystalline citric acid was added to the pectin slurry to give a final concentration of 2% (w/w) citric acid and mixed by stirring on a hot plate stirrer until complete dissolution. The pectin slurry was poured onto a rimmed glass frame (200×200 mm) and allowed to air-dry under ambient conditions for 36 hours. The resulting pectin film was manually peeled off and cut into 10 cm$^2$ surface area (5 cm×2 cm) rectangular pieces and stored under ambient conditions until further use. The pectin functional layer thickness was 0.2±0.02 mm and contained 17% citric acid (dry basis) and 20% moisture (dry basis).

Gelatin functional layer: Gelatin films may be manufactured by any known method, such as solution casting technique. Gelatin powder 250 Bloom was added to a final concentration of about 15% (w/w) in a slow stream to water with about 3% (w/w) glycerol under high agitation using a hot plate stirrer, the slurry was heated to temperature of about 60 to about 80° C. to prevent gelatin clumping, mixed until complete gelatin dispersion and dissolution, then cooled to about 40° C. Sodium chlorite salt in the dry form was added to gelatin blend while stirring to give a final concentration of about 4% (w/w) of sodium chlorite. The mixture was homogenized for about 5 minutes until complete dissolution of sodium chlorite salt and then poured onto a rimmed glass frame (200×200 mm) and allowed to air-dry under ambient conditions in the dark for about 12 hours. The gelatin functional layer was manually peeled off the glass and stored at 100% relative humidity and 25° C. until used. The gelatin functional layer was cut into 5 cm×2 cm rectangular labels with 0.4±0.1 mm thickness and contained 7% sodium chlorite (dry basis) and 65% moisture (dry basis).

Gelatin barrier layer: Gelatin barrier layers were prepared in the same manner as the gelatin functional layer but without the addition of sodium chlorite salt. The thickness of the gelatin barrier film was in the order of about 0.4±0.1 mm and its moisture content was 69% (dry basis).

Figure 2:
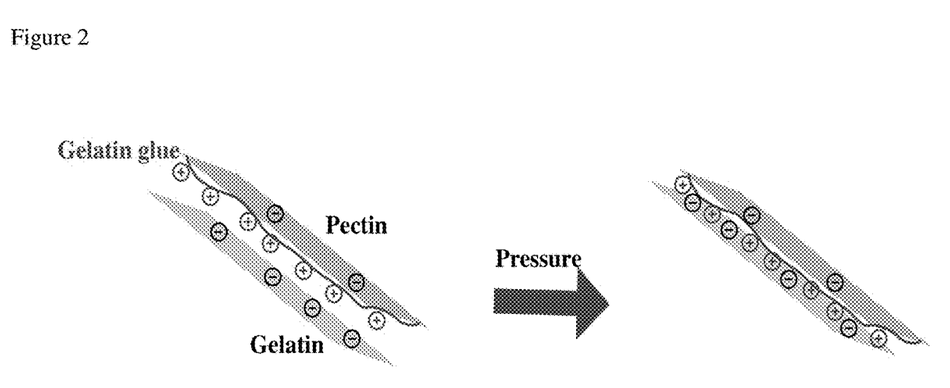

Gelatin glue solution: The gelatin glue solution (final concentration of about 40% w/w water) was prepared by adding gelatin to heated water (pH 3.5) followed by slow stirring until the temperature reached about 60 to about 65° C. The functional layers w/ or w/o barrier layers of the package label were glued together using the gelatin glue solution. Gelatin glue solution was applied as a thin and continuous film and spread evenly onto the package layers to be bonded. Upon application of about 100 K Pa pressure (with or without heat) using a heat-press, the layers came in close contact and the positive charge on gelatin at pH 3.5 established electrostatic links with the negatively charged gelatin hydrogel containing sodium chlorite at pH 8.4 (pI=4.8-5) and slightly negatively charged pectin containing citric acid at pH 2.6 (pKa=3.5), binding the two layers together (FIG. 2).

Multilayer Label Assembly: Multilayer Label without Barrier Layers (ML w/o BL) was composed of two gelatin functional layers positioned alternately between three pectin functional layers. Pectin and gelatin functional layers were assembled at the point of use, before analysis. Using a paintbrush, gelatin glue was applied evenly as a thin film to the first pectin layer surface to be bonded. When the glue film was tacky, a gelatin functional layer was applied. These steps were repeated, adding successive alternate pectin and gelatin layers until the last pectin functional layer was applied. The final assembled label had a surface area of 10 cm$^2$ and 1.4 mm thickness.

Multilayer label with barrier layers (ML w/ BL) was composed of two gelatin functional layers positioned alternately between three pectin functional layers with gelatin barrier layers separating pectin and gelatin functional layers (total of four barrier layers) to delay ClO$_2$ generation and release. Pectin and gelatin functional layers and gelatin barrier layers were assembled at the point of use in the same manner as the multilayer label without barrier layers. Final assembled labels had a surface area of 10 cm$^2$ and 3 mm thickness.

Controlled Activation Mechanism of Package Labels: Generation of ClO$_2$ by the assembled multilayer labels is triggered by applying pressure (with or without heat) using a heat press (Sencorp Systems Inc.; Hyannis, Mass.). The assembled multilayer label was placed between the bars of the heat press and pressure (about 100 Kpa, with or without heat) was applied for about 5 s. Pressure was applied uniformly to ensure complete contact between surfaces to be bonded.

"Optional" or "optionally" means that the subsequently described event or circumstance may or may not occur, and that the description includes instances in which said event or circumstance occurs and instances where it does not. For example, the phrase "optionally comprising a defoaming agent" means that the composition may or may not contain a defoaming agent and that this description includes compositions that contain and do not contain a foaming agent.

The terms "label" and "insert" are interchangeable. By the term "effective amount" of a compound or property as provided herein is meant such amount as is capable of performing the function of the compound or property for which an effective amount is expressed. As will be pointed out below, the exact amount required will vary from process to process, depending on recognized variables such as the compounds employed and the processing conditions observed. Thus, it is not possible to specify an exact "effective amount." However, an appropriate effective amount may be determined by one of ordinary skill in the art using only routine experimentation.

The amounts, percentages and ranges disclosed herein are not meant to be limiting, and increments between the recited amounts, percentages and ranges are specifically envisioned as part of the invention.

Unless defined otherwise, all technical and scientific terms used herein have the same meaning as commonly understood by one of ordinary skill in the art to which the invention belongs. As used herein, the term "about" refers to a quantity, level, value or amount that varies by as much as 10% to a reference quantity, level, value or amount.

Although any methods and materials similar or equivalent to those described herein can be used in the practice or testing of the present invention, the preferred methods and materials are now described.

The following examples are intended only to further illustrate the invention and are not intended to limit the scope of the invention as defined by the claims.

EXAMPLES

After activation, the labels (prepared as described above) were transferred into 40 mL Environmental Protection Agency (EPA) amber glass vials assembled with 24 mm Miniret Valves and containing 3 mL of distilled water. Moisture vapor generated during incubation mimicked water vapor released from fresh produce respiration and stimulated sustained release of $ClO_2$ from the labels.

Quantitative Determination of $ClO_2$ from Biobased Labels: The concentrations of gaseous $ClO_2$ in the headspace of the vial and dissolved in water were quantified at each sampling time. Headspace $ClO_2$ was the amount generated from the label into the headspace and dissolved $ClO_2$ represents the amount that found its way to the water phase. Total $ClO_2$ concentration computed as the sum of both concentrations accounted for all $ClO_2$ in the system. For headspace sampling, 1.5 mL of chilled (7° C.) distilled water were first drawn into a 3 mL syringe, then the tip of this syringe was inserted into the vial sampling port and 0.5 mL of headspace was slowly drawn, raising syringe contents to the 2 mL mark. The contents in the syringe were mixed by shaking for ten seconds, and then transferred to a standard 1.5 mL cuvette. Absorbance was measured at 360 nm (Masschelein, 1979) in UV-VIS Spectrophotometer. At the same sampling time, 1.5 mL of water contained in the vial were drawn and mixed with 100 ml distilled water, and the absorbance was measured at 360 nm. At each sampling time, the sampling volume (1.5 mL) of water withdrawn from the vial was replaced with the same volume of distilled water. $ClO_2$ concentrations were calculated according to Beer's Law using the equation $(ClO_2)(M)=(A/\epsilon 1)$, where A is absorbance of sample read at 360 nm wavelength, $\epsilon$ is molar absorptivity of $ClO_2$ (1250 $LM^{-1}cm^{-1}$) (Masschelein, 1979) and 1 is the path length of the sample cuvette (1 cm). The total amount of $ClO_2$ generated from each label at each sampling time was derived from concentration using molecular weight of $ClO_2$ (67450 mg/mol).

$ClO_2$ (mg) released from all biobased labels was measured over time (97 h) at room temperature (23° C.) and at 10° C. Each sample label was run in triplicate (experimental replicates) in three independent analyses (replicates of analysis). Values reported were the average of replicate analysis of each sample label.

Antimicrobial Effectiveness of Biobased Labels on Salmonella cells: Effectiveness of multilayer labels in preventing microbial growth was performed using 250 ml amber straight side jars. Salmonella Montevideo G4639, ATCC BA-710 (a clinical isolate associated with a tomato outbreak), was obtained from the American Type Culture Collection (Manassas, Va.). Stock cultures were stored in tryptic soy broth (TSB) containing 20% glycerol at −80° C. Working stocks were maintained at 4° C. for 2-4 weeks on tryptic soy agar (TSA) slants containing 0.6% yeast extract. A loop full of culture from a TSA slant was transferred into 10 ml of TSB and allowed to grow for approximately 8 h at 37° C. This culture was used to inoculate fresh 10 ml of the same medium at 0.01% (v/v) level, and the new population was allowed to grow overnight to stationary phase at 37° C. The fresh culture (10 μl) was directly plated without further dilution on TSA in duplicate sets of 50 mm PALL Sterile Petri Dishes. Each inoculated plate was placed uncovered in a 250 ml amber jar (Fisher Scientific) without (control) or with activated multilayer labels, in the presence of 3 ml of water contained in a vial taped to the side of the jar. Jars were covered using 70-400 closures with bonded liner and held at room temperature for 2, 4, or 6 h for the multilayer labels without barrier layers and 2, 4 and 8 h for the multilayer labels with barrier layers. TSA plates were removed from the jars at each sampling time and incubated at 37° C. for 24 h, and cell concentrations were then enumerated.

Antimicrobial Effectiveness of Biobased Labels on Inoculated Mung Bean Seeds: To prepare the inoculum for the seeds, Salmonella Montevideo G4639 was grown overnight in 200 ml of TSB as previously described, spun down, washed once with sterile doubly distilled water (dd $H_2O$), and suspended in 200 ml sterile dd$H_2O$ to give a final cell concentration of ca. 8 log CFU/ml. This was used as the inoculum to inoculate the seeds. Raw mung bean seeds (Vigna radiata), unprocessed and not subjected to any additional cleaning procedure, were obtained from The Sprout House (Lake Katrine, N.Y.). Mung bean seeds were inoculated as previously described by Annous and Burke (2015). Briefly, mung bean seeds were rinsed under running dd$H_2O$ until the water ran clear (ca. 5 min) to remove dirt and surface debris. Cleaned mung bean seeds were submerged in 200 ml of inoculum at room temperature (RT; 21° C.) for 20 min with mixing every two minutes for 30 seconds using a spoon. Seeds were placed on an absorbent paper under a laminar biosafety flow hood and allowed to dry for 3 h. Inoculated seeds were then stored at 4° C. overnight prior to treatments, to allow for bacterial attachment and/or biofilm formation (Annous and Burke, 2015). Inoculated seed samples (15 g) were placed in 250 ml amber jar without or with activated multilayer labels, covered with 70-400 closures having bonded liners and incubated at room temperature for 2, 4, or 6 h for the multilayer labels without barrier layers and 2, 4 and 8 h for the multilayer labels with barrier layers. Seeds were removed from the jars at each sampling time and analyzed for residual Salmonella population by counting cell outgrowth on selective media, xylose lysine Tergitol-4 agar (XLT-4; BBL).

For enumeration of Salmonella populations on seeds, separate sterile 1-liter stainless steel blender jars for each sample were sanitized with 400 ppm chlorine solution and rinsed twice with deionized water between every single use. Sanitized jars were then autoclaved for sterilization to ensure that there was no carryover of Salmonella cells between each analysis. Each seed sample (15 g) was placed in a stainless steel blender jar, combined with 150 ml neutralizing buffer (NB), and blended at medium speed for 2 min using a commercial Waring Blender Model 51BL31. The resulting homogenate was placed in a filter bag and duplicate 10-ml samples of filtrate were transferred to sterile tubes. The filtered homogenates were then serially-diluted in 0.1% peptone water (PW) as needed and surface plated on the selective XLT-4 medium. All plates were then incubated at 37° C. for 24-48 h, and the resulting colonies were enumerated. Microbial outgrowth was expressed as log CFU/g seed.

Statistical Analysis: Differences in Salmonella populations exposed to $ClO_2$ gas released from biobased labels at different sampling times on inoculated mung bean seeds were analyzed by single-factor analysis of variance tests and t tests using Microsoft Excel 2007. A 95% confidence level ($p<0.05$) was considered significant.

Figure 3:
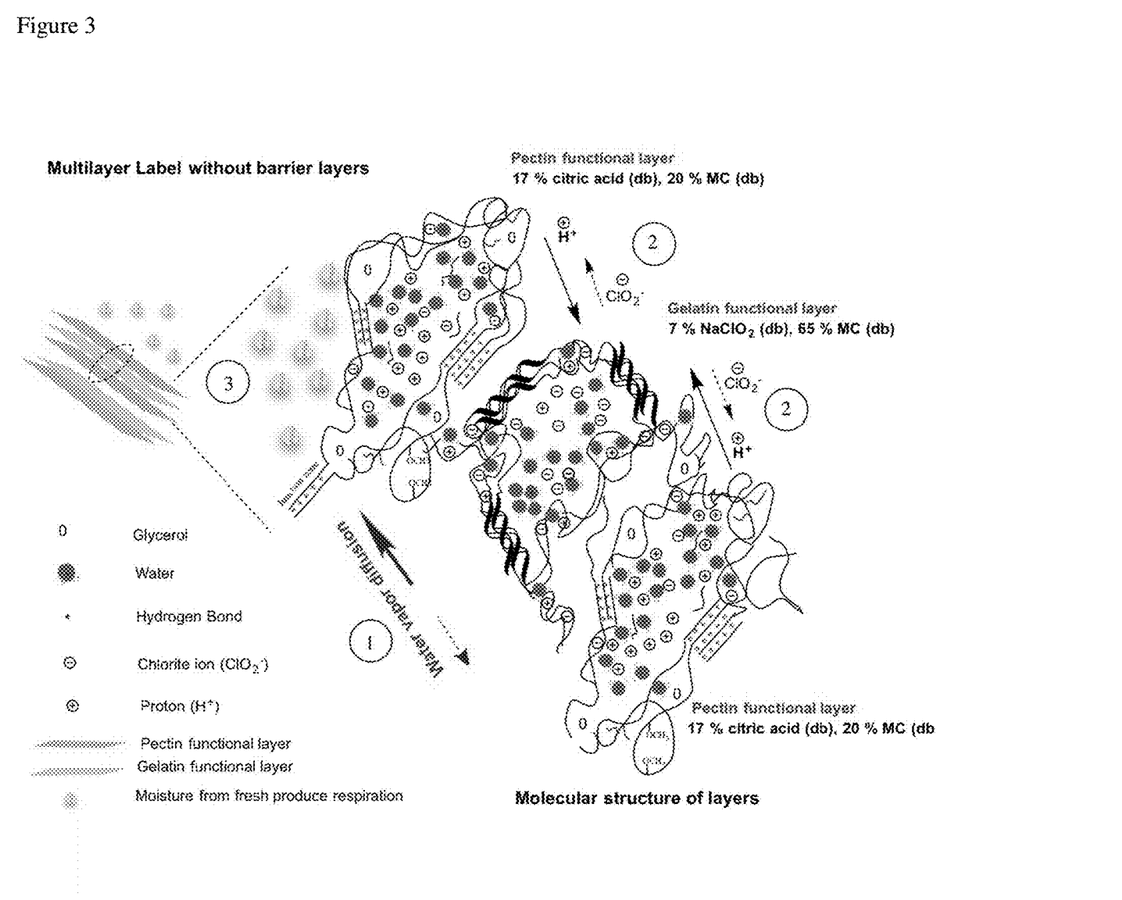
Figure 4:
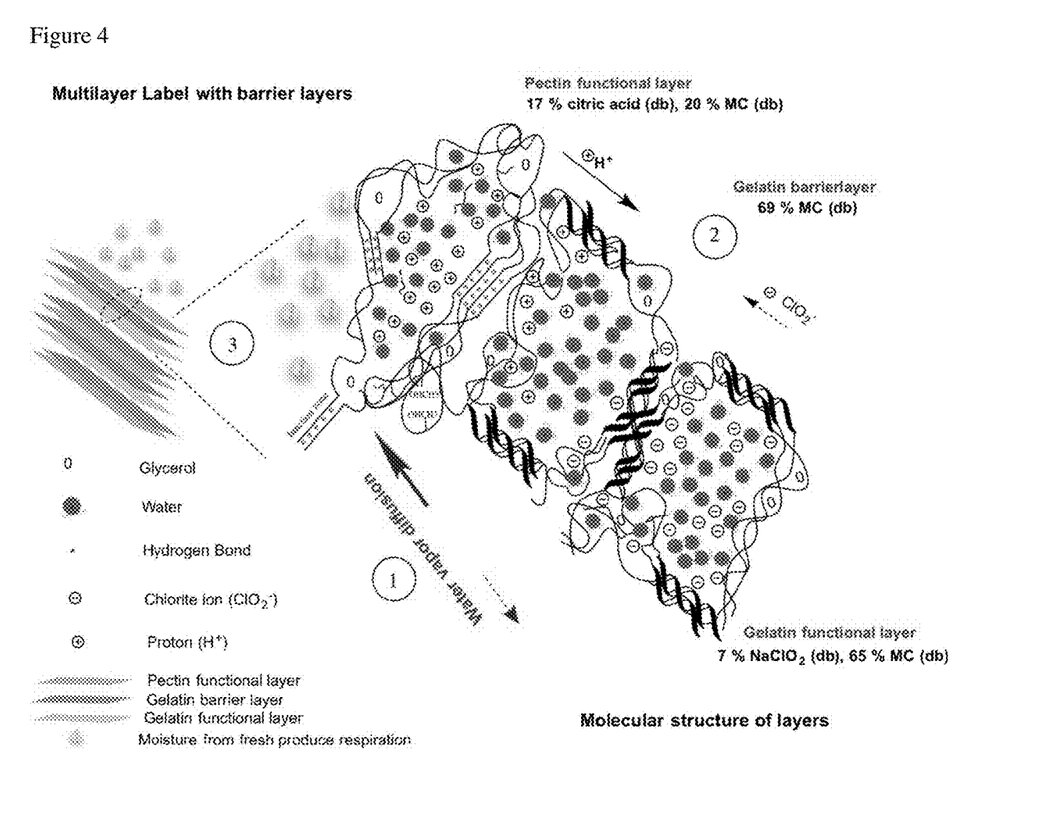

Results and Discussion. Quantitative Determination of $ClO_2$ from Biobased Labels: In the case of ML w/o BL, $ClO_2$ release from labels was attributed first to the instantaneous reaction of $ClO_2$ precursors at the interface pectin/gelatin functional layers following applying the pressure (surface reaction; FIG. 3). Following the first event, moisture and chlorite ions slow diffusion from gelatin functional layer in the direction of upper and lower pectin layers caused relaxation of these matrices and diffusion of protons down their gradient of concentration producing and releasing $ClO_2$. These combined events account for only about 9% of the total $ClO_2$ released from this label. The remaining (about 91%) $ClO_2$ (about 91%) was mediated by the third and most predominant event—sorption of moisture from the headspace. Sorption of water vapor released to the headspace from the vial or respiration of fresh produce causes swelling and relaxation of pectin and gelatin matrices, which increases the mobility of $ClO_2$ precursors and facilitates their diffusion between layers, resulting in $ClO_2$ generation and sustained release out of the label over time until full consumption of reactants.

Figure 5:
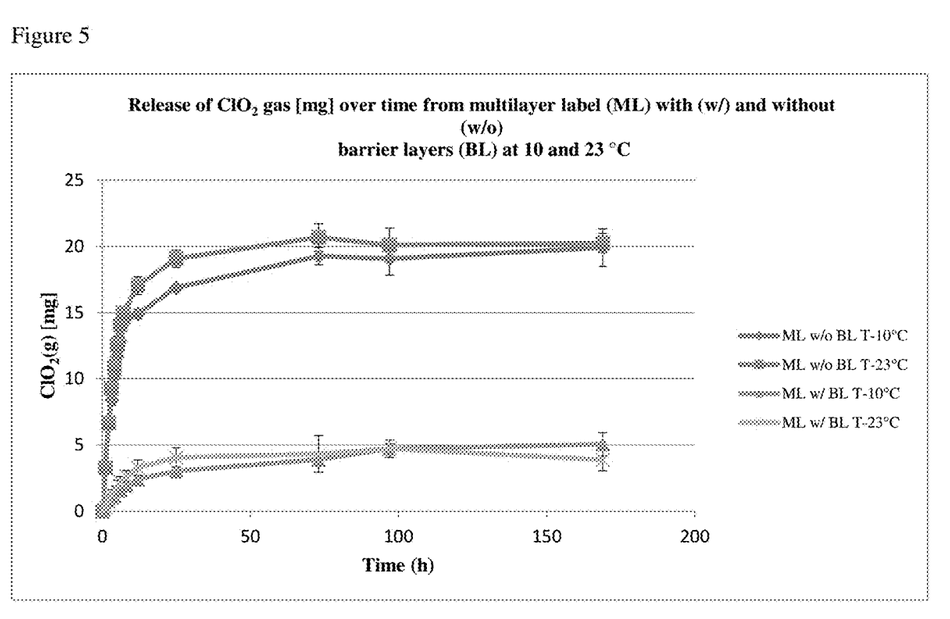
Figure 6:
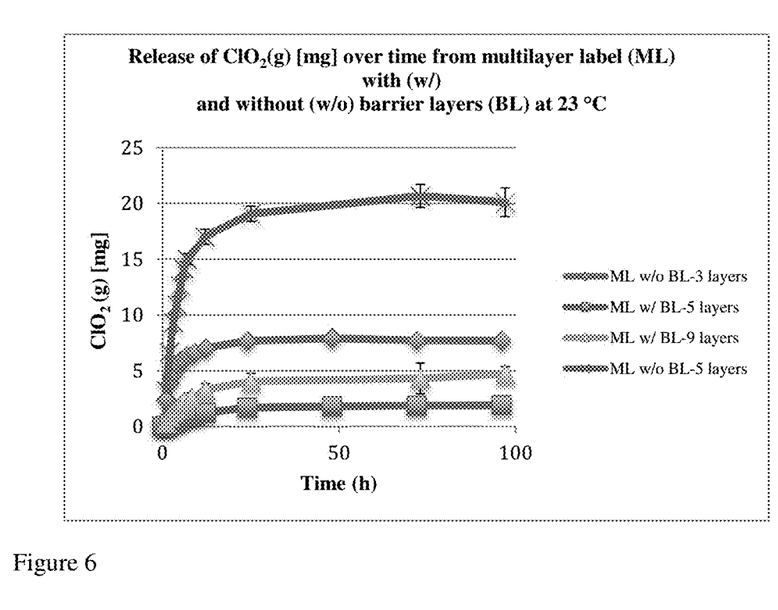

ML w/o BL surprisingly released total amounts (headspace and water) of $ClO_2$ at levels up to about 19.1 mg after about 7 days (169 hours) (FIG. 5). The main release surge was surprisingly achieved within about 11 hrs of release and the final constant level of $ClO_2$ was surprisingly reached within about 30-60 hrs. This reflected equilibrium between continued release from the label and condensation into the water over the entire period of release. The total $ClO_2$ released from this label corresponds to a lower $ClO_2$ yield than from an aqueous solution made of a mixture of sodium chlorite salt and citric acid at the same concentration as that found in the label. Without being bound by theory, this could be explained by several events occurring either pre- and post-$ClO_2$ generation: 1) Not all of the $ClO_2$ precursors diffused and reacted to generate $ClO_2$; 2) poor binding between the different layers upon swelling, impeding diffusion of the reactants and subsequent generation and release of $ClO_2$ from the label; 3) not all $ClO_2$ produced was released in the headspace of the vial as some got entrapped in the swollen matrices while some got consumed by other side reactions.

There was surprisingly very little effect of temperature on the release profile of $ClO_2$ from labels stored at 10 and 23° C. Lowering the temperature to 10° C. (mimicking refrigerated storage) surprisingly did not affect $ClO_2$ generation and release because the synthesis reaction has low activation energy and there is sufficient molecular mobility at this low temperature that reactants collide effectively and release $ClO_2$ (FIG. 5).

Most research conducted so far on gaseous $ClO_2$ used one-time exposure to this compound at a constant concentration over a predetermined period of time (Gómez-López 2009). In contrast, our label constitutes a controlled release system with rate of $ClO_2$ release changing over time in response to microbial growth and release of moisture from respiration. The release of $ClO_2$ from this label of about 19.1 mg/L air over 169 hours surprisingly fell within the $ClO_2$ concentration range currently used in literature for the disinfection of fresh produce (1-18 mg/L air)(Gómez-López 2009).

In the case of ML w/BL, introduction of gelatin barrier layers-between the pectin and gelatin functional layers slowed the rate and reduced the maximum levels of $ClO_2$ released from the multilayer labels (FIG. 5 and FIG. 6). Initial rapid release occurred over 8-12 hours and maximum $ClO_2$ levels were about 5 mg after 169 hours, 75% lower than the amount of $ClO_2$ produced by ML labels w/o BL (FIG. 5 and FIG. 6). Release of $ClO_2$ at concentrations varying from about 0.3 mg/L air after 1 hour of release to about 5 mg/L air after about 8-12 hours surprisingly fell within the range of $ClO_2$ target concentrations used in the disinfection of fresh produce (Gómez-López, 2009).

Without being bound by theory, lower levels of $ClO_2$ produced by these labels with barriers could be attributed to several factors: 1) the introduction of barrier layers added more organic molecules to the system resulting in higher consumption of $ClO_2$ by its reaction with organic molecules; 2) the swollen label entrapped higher amount of $ClO_2$ soluble in water located within spaces of the network, preventing its diffusion and release into the headspace due to its high solubility in water (about 70 g/L in water at 20° C. and 760 mm Hg) (Mortimer, C. E., Chemistry-A Conceptual Approach, 1967, Reinhold Publishing Corporation); 3) poor binding between the different layers became more pronounced upon swelling, impeding diffusion of the reactants and subsequent generation and release of $ClO_2$ from the label and; 4) not all of the reactants loaded into the pectin and gelatin functional layers diffused and reacted.

When barrier layers were present, direct contact between pectin and gelatin functional layers was disrupted and $ClO_2$ generation was due only to diffusion of $ClO_2$ precursors throughout their respective polymeric networks (protons in the pectin functional layer and chlorite ions in the gelatin functional layer). At first, migration of endogenous high moisture from the gelatin barrier layer caused some softening of the pectin functional layer, and activated higher proton mobility and diffusion throughout the pectin matrix down the concentration gradient towards the gelatin barrier layer. At the same time, chlorite ions diffused through gelatin functional layers towards the gelatin barrier layers enabling chemical reaction upon effective collision between protons and chlorite ions to generate $ClO_2$ (FIG. 4). Moisture evaporated from water in the vial and adsorbed onto the package label then caused pronounced swelling of layers greatly enhancing the generation and release of the bulk of $ClO_2$ into the headspace over time (FIGS. 5 and 6).

Lowering the temperature to 10° C. surprisingly did not alter the release profile of $ClO_2$ by the ML w/BL label indicating, that even at this lower temperature, there was sufficient thermal energy for many of the reactant molecules to reach the transition state in a short time and produce $ClO_2$ (FIG. 5). Similar observation was seen with ML w/o BL (FIG. 5).

Antimicrobial Effectiveness of Biobased Labels: For the sake of simplicity, labels used in this part had fewer layers than those evaluated by quantitative analysis. ML w/o BL was composed of three layers (one gelatin functional layer sandwiched between two pectin functional layers) and ML w/BL was made of five layers (two pectin functional layers, one gelatin functional layer and two gelatin barrier layers). These new labels released about 60% less $ClO_2$ than the original ones (FIG. 6), with ML w/o BL producing about 7.7 mg of $ClO_2$ and ML w/ BL releasing about 1.7 mg of $ClO_2$ over 100 hours.

Biobased Label Inhibition of *Salmonella* Growth on TSA Plates: The purpose of this experiment was to validate the technical feasibility of using biobased labels to generate and release $ClO_2$ at concentrations that effectively inactivate the growth of *Salmonella* on TSA plates. Although ML w/o BL labels released more $ClO_2$ than those produced by ML/w/BL labels (FIGS. 5 and 6), both with and without barrier layers surprisingly generated and released $ClO_2$ at concentrations sufficient to completely inactivate *Salmonella* growth on TSA plates within the first 2-hour exposure (Table 1). Concentrations of $ClO_2$ as low as about 1.2 mg/L air were surprisingly able to achieve 8.1 log reductions of *Salmonella* Montevideo G4639 on TSA plates following 2 hour exposure to the ML w/BL.

Biobased Label Inhibition of *Salmonella* Growth on Inoculated Mung Bean Seeds: Higher levels of $ClO_2$ were released from ML w/o BL so correspondingly higher inactivation of *Salmonella* was expected. However, even with barriers both labels surprisingly achieved up to 2 log reduction of *Salmonella* on inoculated mung bean seeds (Table 2).

Figure 7:
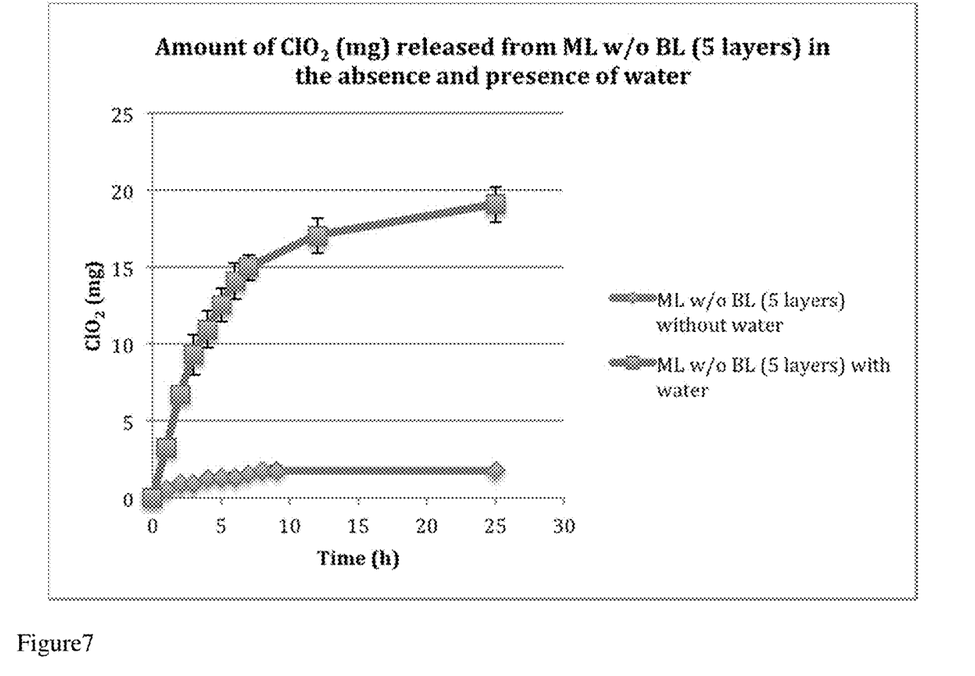
FIG. 7 shows the release profiles profile of $ClO_2$ gas (mg) from multilayer label (5 layers) without gelatin barrier layers in the absence or presence of water vapor in the jars after controlled activation at 23° C. as described below. The addition of water vapor to the headspace in the jar resulted in significant increase (about 90%) in total $ClO_2$ production. This data suggested that water vapor (humidity) is needed for long term (see above under FIG. 3) $ClO_2$ release by these labels.

Without being bound by theory, these results can be explained by the following: the apparent reversal of label effects and lower effectiveness than on TSA medium occurred because Mung bean seeds act differently than fresh produce. The respiration rate of seeds at the dormant stage occurs at a very slow rate compared to germination stage where high-energy needs of germinating beans significantly increase rates of cellular respiration and moisture release (Bewley, J. D., and M. Black, Seeds, 1994, Springer). Under low humidity conditions maintained in the jar's headspace by the low respiring mung bean seeds, the generation and release of $ClO_2$ from labels is very low and solely dependent on the moisture content of gelatin functional and barrier layers acting as short-term trigger to $ClO_2$ production. FIG. 7 shows the effect of moisture on $ClO_2$ release by the labels. High humidity conditions in the jar resulted in about 90% increase in $ClO_2$ release (FIG. 7). Also, the irregular surface structure and morphology of mung bean seeds has hidden surfaces harder to reach even with gaseous $ClO_2$, in contrast to the smooth surface of TSA medium, which exposes all *Salmonella* cells uniformly to $ClO_2$.

The extent of microbial inhibition on inoculated mung bean seeds exposed to ML w/o and w/ BL were surprisingly within the range of inactivation level of *Salmonella enterica* serotypes achieved by Sy et al. (Sy, K. V., et al., J. of Food Protection, 68(6): 1165-1175 2005)) on blueberries, strawberries, and raspberries. These researchers exposed the produce to 8 mg $ClO_2$/L air using mixed precursors in a pouch. Also, higher inactivation level of *Salmonella* on grape tomatoes, in excess of 3 log reductions, following 24 h exposure to polylactic acid (PLA) films releasing $ClO_2$ at concentrations up to 1.8 mg/L (Ray et al., 2013, J. of Food Science, 78(2): 276-284 (2013). Prodduk et al. (2014) (Prodduk, V., et al., J. of Food Protection, 77(11): 1876-81 (2014)) reported up to 4 log CFU *Salmonella*/g mung bean sprouts following exposure to constant $ClO_2$ concentration (0.5 mg/L air for 15, 30, and 60 min). The generation of $ClO_2$ was done using a commercial system with on and off controls.

Without being bound by theory, differences in the biocidal activity of $ClO_2$ between the sachet system and $ClO_2$ releasing labels used in our research were attributed to differences in fresh produce surface structure and morphology, and experimental conditions used to test these systems. For instance, placing fruits in a single layer instead of multiple layers, the use of a cooling fan for more uniform air and $ClO_2$ circulation inside the treatment cabinet, and control of constant high relative humidity in the chamber to sustain the release of $ClO_2$ form these systems all influence the release rate of $ClO_2$ and its antimicrobial effect on inoculated fresh produce (Sy et al. 2005).

Conclusions: The technical feasibility of the tested package label composed of alternating gelatin and pectin layers depends on the ability to design and manufacture the label, activate it, and have it generate and release $ClO_2$ in a controlled manner at levels adequate for microbial inactivation. Both release kinetics and microbial inactivation were in good agreement and support the technical feasibility of biobased package labels in terms of label design and manufacture, $ClO_2$ generation and release after controlled activation, and antimicrobial effectiveness against *Salmonella* growth.

Label manufacture from the processing standpoint was feasible. Two multilayer biobased labels made with pectin and gelatin, were successfully manufactured, one without gelatin barrier layers and one with gelatin barrier layers to control the release of $ClO_2$ over time.

Biobased multilayer label without and with barrier layers generated two release profiles for $ClO_2$ after controlled activation, a faster release profile observed with labels without barrier layers, and a slower release profile obtained from the introduction of barrier layers, at high humidity conditions. Both labels surprisingly generated and released sufficient $ClO_2$ to achieve about 8 log reductions of *Salmonella* on TSA plates and about 2 log reductions of *Salmonella* on inoculated mung bean seeds.

The biobased labels were also feasible from practical aspects. The target concentration of $ClO_2$ specific to fresh produce commodities is defined as the concentration of $ClO_2$ needed to achieve total or partial inhibition of microorganisms of interest on specific fresh produce without compromising the quality attributes of the fresh produce. Without being bound by theory, target concentrations could vary with time (different than single exposure) and are dependent on 1) the release kinetics of labels, a function of label design (polymer type, loading, surface area and thickness), 2) the package volume, and 3) temperature. Multilayer labels without and with barrier layers surprisingly generated and released $ClO_2$ at concentrations within the target concentration range reported in the literature for the disinfection of fresh produce, mostly applied as a single exposure treatment (0.5-18 mg/L air)(Gómez-López 2009). The antimicrobial efficacy of both labels on *Salmonella* populations (about 2 log reductions) on the surface of mung bean seeds was surprisingly within the *Salmonella* inactivation range reported by others, 1.54-5.15 log reduction as a function of treatment: one-time application of $ClO_2$ spanning treatment time from 6 min to 120 min depending on fresh produce and target microorganism. One surprising advantage of the current labels was the sustained release of $ClO_2$ they can achieve over time, as opposed to one-time exposure to this compound. These labels could be optimized to achieve different $ClO_2$ profiles targeted to specific fresh produce or specific decontamination operation and target microorganisms.

All of the references cited herein, including U.S. Patents and U.S. Patent Application Publications, are incorporated by reference in their entirety. Also incorporated by reference in their entirety are the following references: Aieta, E. M., and J. D. Berg, J. of the American Water Works Association, 78(6): 67-72 (1986); Bernarde, M. A., et al., J. Appl. Microbiol., 15(2): 257 (1976); Han, Y., et al., Food Microbiology, 17(5): 521-533 (2000); Keskinen, L. A., et al., Int. J. Food Microbiol., 132: 134-140 (2009); Rubino, M., Netramai, S., Auras, R., & Annous, B. A. (2014). Product packaging system with antimicrobial agent. U.S. Patent 2014/02312831 A1; Rubino, M., Siddiq, M., Auras, R., Annous, B. A., & Netramai, S. (2011). Package system with distribution gas insert. U.S. Patent 2011/0155618 A1.

Thus, in view of the above, there is described (in part) the following:

A chlorine dioxide releasing package label/insert to be used inside a package or in an outer plastic bag containing several individual packages, said package label/insert comprising (consisting essentially of or consisting of) (a) at least one layer of pectin and citric acid, (b) at least one layer of gelatin and sodium chlorite, (c) optionally at least one barrier layer (for controlling the release of gaseous chlorine) comprising (consisting essentially of or consisting of) gelatin between said at least one layer of pectin and citric acid and said at least one layer of gelatin and sodium chlorite, and (d) an adhesive joining said layers, wherein said package label/insert has alternating layers of said at least one layer of pectin and citric acid and said at least one layer of gelatin and sodium chlorite (each layer of pectin and citric acid is adjacent to each layer of gelatin and sodium chlorite). The above package label/insert, wherein said adhesive is a gelatin glue solution applied to the surface of said layers.

The above package label/insert, wherein said package label/insert does not contain any barrier layers.

The above package label/insert, wherein said package label/insert does contain at least one barrier layer.

The above package label/insert, wherein said package label/insert contains between 3 to 9 layers.

A method of killing microorganisms on an item, said method comprising (consisting essentially of or consisting of) placing said item in a container with the above package label/insert or in an outer plastic bag containing several individual packages and applying pressure (with or without heat) to said package label/insert to cause said citric acid to come into contact with said sodium chlorite to produce $ClO_2$, wherein said package label releases $ClO_2$ at concentrations of about 0.5 to about 20 mg/L air.

A chlorine dioxide releasing biobased package label/insert to be used inside a package or in an outer plastic bag containing several individual packages comprising (consisting essentially of or consisting of) functional multilayer components embedded with chlorine dioxide precursors, such as citric acid and sodium chlorite, for releasing gaseous chlorine dioxide; chlorine dioxide precursors separated from each other by being embedded in distinct layers of said functional multilayer components, only combined when release of chlorine dioxide is desired by the user; an optional barrier layer components for controlling the release of gaseous chlorine dioxide inserted between said functional multilayer components; an adhesive joining the said functional multilayer components with or without said optional barrier layer component for label assembly; a controlled activation mechanism for triggering the reaction between the precursors for the release of gaseous chlorine dioxide when desired by the user; a source of moisture for sustaining the release of gaseous chlorine dioxide; a surface area, thickness, number and hydrophilic biobased polymer composition of layers adjustable to suit different package volumes and match the microbial inactivation kinetics requirement of a food product; a versatility of package forms and food application; a flexibility in commercial production and integration into processing; and a dual purpose of information and functionality.

A chlorine dioxide releasing biobased package label/insert as recited above, to be used inside a package or in an outer plastic bag containing several individual packages, wherein said functional multilayer component is composed of at least one layer of pectin embedded with citric acid and one layer of gelatin embedded with sodium chlorite.

A chlorine dioxide releasing biobased package label/insert as recited above, to be used inside a package or in an outer plastic bag containing several individual packages, wherein pectin layer embedded with citric acid and gelatin layer embedded with sodium chlorite salt are kept separate until label assembly on line during packaging of food product.

A chlorine dioxide releasing biobased package label/insert as recited above, to be used inside a package or in an outer plastic bag containing several individual packages, as recited in claim 1, wherein said optional barrier layer is made of gelatin and is used to manipulate the release rate and/or concentration of chlorine dioxide.

A chlorine dioxide releasing biobased package label/insert as recited above, to be used inside a package or in an outer plastic bag containing several individual packages, wherein said adhesive is a gelatin glue solution applied to the surface of individual layers to adhere these layers to one another upon label assembly.

A chlorine dioxide releasing biobased package label/insert to be used inside a package or in an outer plastic bag containing several individual packages as recited above, wherein said controlled activation mechanism consists of assembling the label and compressing (with or without heat) it for a short period of time to activate this label by triggering the reaction between chlorine dioxide precursors, embedded in pectin and gelatin functional layers, to generate chlorine dioxide and release it from the label.

A chlorine dioxide releasing biobased package label/insert to be used inside a package or in an outer plastic bag containing several individual packages as recited above, wherein said source of moisture from respiration of fresh produce is used to sustain the release of chlorine dioxide from the label by increasing mobility and diffusion of chlorine dioxide precursors in their respective layers and generation and release of chlorine dioxide until complete reaction.

A chlorine dioxide releasing biobased package label/insert to be used inside a package or in an outer plastic bag containing several individual packages as recited above, wherein said number and composition of layers as well as surface area is used to manipulate the release rate and/or concentration of chlorine dioxide produced. Different label designs having the same surface area but variable number of layers: 2 labels without barrier layers (one composed of 3 layers and one composed of 5 layers) and 2 labels with barrier layers (one composed of 5 layers and one composed of 9 layers) used to control the concentration and/or release rate of gaseous chlorine dioxide.

A chlorine dioxide releasing biobased package label/insert to be used inside a package or in an outer plastic bag containing several individual packages as recited above, further displaying versatility in package form (label or insert) and an application not limited to respiring foods only but also to non-respiring, low and high moisture foods.

A chlorine dioxide releasing biobased package label/insert to be used inside a package or in an outer plastic bag containing several individual packages as recited above, further displaying commercial flexibility by using commercially available techniques for its production such as coating, and ease of integration into processing at the same time as the food is being packaged on the packaging line.

Figure 8:
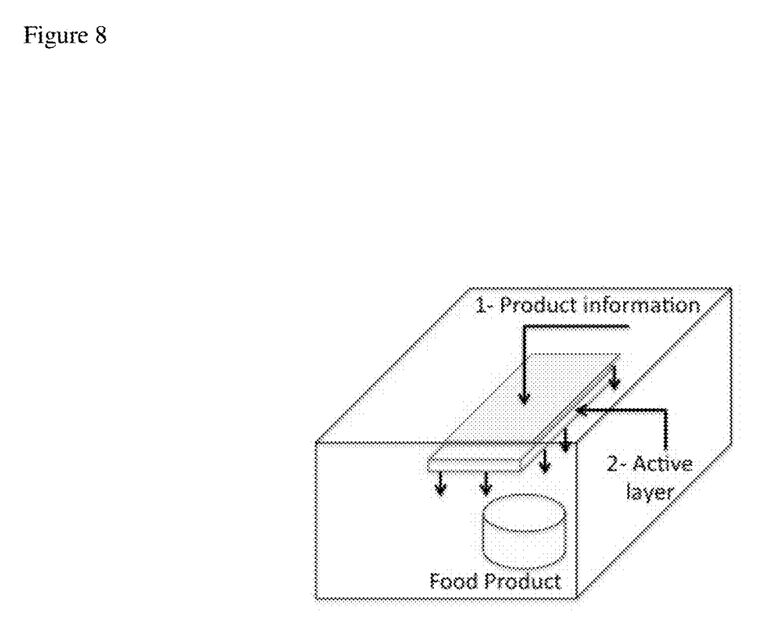
FIG. 8 shows an example of our $ClO_2$ releasing biobased package label/insert to be used inside a package. The label/insert serves the dual function of (1) providing product information (product information layer) and (2) releasing active compounds in a controlled manner to improve microbial safety and shelf-life of the food product in transparent packages (active layer).

A chlorine dioxide releasing biobased package label/insert to be used inside a package or in an outer plastic bag containing several individual packages as recited above, further where label/insert serves the dual function of (1) providing product information (product information layer) and (2) releasing active compounds in a controlled manner to improve microbial safety and shelf-life of the food product in transparent packages (active layer). For opaque packages, the label serves only the second function (see FIG. 8).

A chlorine dioxide releasing biobased package label/insert to be used inside a package or in an outer plastic bag containing several individual packages as recited above, further where other compatible biobased polymers other than those described herein (namely, pectin and gelatin) are potential package label for use in place of pectin and gelatin and/or a combination of such biobased polymers.

The term "consisting essentially of" excludes additional method (or process) steps or composition components that substantially interfere with the intended activity of the method (or process) or composition, and can be readily determined by those skilled in the art (for example, from a consideration of this specification or practice of the invention disclosed herein).

The invention illustratively disclosed herein suitably may be practiced in the absence of any element (e.g., method (or process) steps or composition components) which is not specifically disclosed herein.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

TABLE 1

Effect of $ClO_2$ concentration released from ML w/o and w/barrier layers on *Salmonella* Montevideo growth (log CFU/ml) on TSA plates.

| Label | Sampling Time (h) | Concentration of $ClO_2$ released (mg/L air) ± Standard Deviation | log reduction (log CFU/mL) ± Standard Deviation |
|---|---|---|---|
| ML w/o BL | 2 | 15.6 ± 1.2 | 8.2 ± 0.1 |
|  | 4 | 22 ± 1.2 | 8.2 ± 0.1 |
|  | 6 | 24.8 ± 1.2 | 8.2 ± 0.1 |
| ML w/BL | 2 | 1.2 ± 0.0 | 8.1 ± 0.1 |
|  | 4 | 2.4 ± 0.4 | 8.1 ± 0.1 |
|  | 8 | 4.0 ± 0.8 | 8.1 ± 0.1 |

TABLE 2

Effect of $ClO_2$ concentration released from ML w/o and w/barrier layers on *Salmonella* Montevideo Population (log CFU/g) on Mung Bean Seeds.

| Label | Sampling Time (h) | log reduction (log CFU/g) ± Standard Deviation |
|---|---|---|
| ML w/o BL | 2 | 1.7 ± 0.3 [a] |
|  | 4 | 1.6 ± 0.2 [a] |
|  | 6 | 1.7 ± 0.3 [a] |
| ML w/BL | 2 | 1.9 ± 0.2 [a] |
|  | 4 | 2.0 ± 0.2 [b] |
|  | 8 | 2.0 ± 0.3 [a] |

The control (without exposure to package label) had initial count of 5.2 log CFU/g. For every exposure time, data points with different letter superscripts were significantly different ($p<0.05$).

We claim:

1. A chlorine dioxide releasing package label/insert to be used inside a package or in an outer plastic bag containing several individual packages, said package label/insert comprising (a) at least one solid layer of pectin and citric acid, (b) at least one solid layer of gelatin and sodium chlorite, (c) optionally at least one solid barrier layer (for controlling the release of gaseous chlorine) comprising gelatin between said at least one layer of pectin and citric acid and said at least one layer of gelatin and sodium chlorite, and (d) an adhesive joining said layers, wherein said package label/insert has alternating layers of said at least one layer of pectin and citric acid and said at least one layer of gelatin and sodium chlorite.

2. The package label/insert according to claim 1, wherein said adhesive is a gelatin glue solution applied to the surface of said layers.

3. The package label/insert according to claim 1, wherein said package label/insert does not contain any barrier layers.

4. The package label/insert according to claim 1, wherein said package label/insert does contain at least one barrier layer.

5. The package label/insert according to claim 1, wherein said package label/insert contains between 3 to 9 layers.

6. The package label/insert according to claim 1, wherein said package label/insert is capable of releasing $ClO_2$ at concentrations of about 0.5 to about 20 mg/L air.

7. A method of killing microorganisms on an item, said method comprising (i) placing said item in a package with a chlorine dioxide releasing package label/insert or (ii) placing a chlorine dioxide releasing package label/insert in an outer plastic bag containing several individual packages containing said item, wherein said chlorine dioxide releasing package label/insert comprises (a) at least one solid layer of pectin and citric acid, (b) at least one solid layer of gelatin and sodium chlorite, (c) optionally at least one solid barrier layer (for controlling the release of gaseous chlorine) comprising gelatin between said at least one layer of pectin and citric acid and said at least one layer of gelatin and sodium chlorite, and (d) an adhesive joining said layers, wherein said package label/insert has alternating layers of said at least one layer of pectin and citric acid and said at least one layer of gelatin and sodium chlorite, and (iii) applying pressure with or without heat to said package label/insert to cause said citric acid to come into contact with said sodium chlorite to produce $ClO_2$, wherein said package label releases $ClO_2$ at concentrations of about 0.5 to about 20 mg/L air.

* * * * *